United States Patent [19]
Thompson

[11] Patent Number: 6,010,037
[45] Date of Patent: Jan. 4, 2000

[54] REFRIGERATOR ICE DISPENSING ASSEMBLY WITH ENHANCED BAFFLE PLATE ARRANGEMENT

[75] Inventor: Virgil R. Thompson, Cameron, Ill.

[73] Assignee: Maytag Corporation, Newton, Iowa

[21] Appl. No.: 09/126,433

[22] Filed: Jul. 30, 1998

[51] Int. Cl.⁷ .................................................. G01F 11/20
[52] U.S. Cl. .................... 222/240; 222/146.6; 222/413
[58] Field of Search ................................ 222/146.6, 240, 222/241, 242, 412, 413

[56] References Cited

U.S. PATENT DOCUMENTS

| | | | |
|---|---|---|---|
| 3,437,244 | 4/1969 | Alvarez et al. | 222/240 |
| 3,570,720 | 3/1971 | Curry, III | 222/240 |
| 3,602,406 | 8/1971 | Jacobus et al. | 222/413 |
| 3,602,441 | 8/1971 | Alvarez | 241/101 |
| 3,798,923 | 3/1974 | Pink et al. | 62/266 |
| 3,824,805 | 7/1974 | Prada | 62/300 |
| 3,843,067 | 10/1974 | Prada | 241/190 |
| 3,874,559 | 4/1975 | Pink | 222/146.6 |
| 3,881,642 | 5/1975 | Hoenisch | 222/370 |
| 3,889,888 | 6/1975 | Prada | 241/101.1 |
| 4,176,527 | 12/1979 | Linstromberg et al. | 62/320 |
| 4,619,380 | 10/1986 | Brooks | 222/240 |
| 4,627,556 | 12/1986 | Brooks | 222/240 |
| 4,942,979 | 7/1990 | Linstromberg et al. | 221/75 |
| 4,972,999 | 11/1990 | Grace | 241/30 |
| 5,037,004 | 8/1991 | Katz et al. | 222/240 |
| 5,050,777 | 9/1991 | Buchser | 222/146.6 |
| 5,056,688 | 10/1991 | Goetz et al. | 222/146.6 |
| 5,273,219 | 12/1993 | Beach, Jr. et al. | 241/65 |

*Primary Examiner*—Joseph A. Kaufman
*Attorney, Agent, or Firm*—Everett G. Diederiks, Jr.

[57] ABSTRACT

A refrigerator ice dispensing assembly includes first, second and third ice delivery units for directing a flow of ice from a collecting bin through a discharge housing. A baffle plate is secured within the discharge housing to divide the same into first and second portions within which are arranged the second and third ice delivery units respectively. The baffle plate is formed with a passage through which the ice cubes are directed by the second ice delivery unit. The passage includes a generally crescent-shaped forward edge that leads from an outer radial edge of the passage to an inner radial edge thereof. The second ice delivery unit includes a central hub having an outer surface that is contiguous with the inner radial edge. The forward edge of the passage terminates directly adjacent the central hub in order to provide structural reinforcement for a high stress concentration zone associated with the passage.

15 Claims, 2 Drawing Sheets

REFRIGERATOR ICE DISPENSING ASSEMBLY WITH ENHANCED BAFFLE PLATE ARRANGEMENT

BACKGROUND OF THE INVENTION

1. Field of the Invention

The present invention pertains to the art of ice dispensing systems for refrigerators and, more particularly, to the configuration and support of a baffle plate incorporated in an ice dispensing assembly of a refrigerator.

2. Discussion of the Prior Art

It is now common practice to provide an automatic ice maker within a freezer compartment of a refrigerator and to further provide a system for dispensing the ice into a recessed receiving area formed in a front panel of the refrigerator. In essence, these systems provide for the automatic filling of ice cube trays which are emptied into a collecting bin following a freezer period. From the collecting bin, the ice can be delivered to the receiving area by the selective activation of a delivery system carried by the collecting bin. Most often, such an ice dispensing system will incorporate a mechanism whereby the ice can be selectively crushed prior to reaching the receiving area.

In the industry, there has been proposed various different systems to accomplish this ice dispensing function. In general, the systems differ in the particular manner in which the cubed and crushed ice are delivered to the receiving area and the way in which the ice is actually crushed. With respect to the manner in which the cubed and crushed ice are delivered, it is known in the art to incorporate two doors in an ice dispensing system with one of the doors functioning to direct cubed ice to the crushing area and the other door being used to deliver the cubed or crushed ice to the receiving area. Therefore, depending upon the position of a user-controlled selector unit, either one or both of the doors will be open for the delivery of ice. In another known arrangement, an ice delivery system is mounted for rotation in opposite directions for dispensing the cubed and crushed ice respectively.

Regardless of the particular ice delivery system utilized, it is desirable to provide a smooth and consistent flow rate of ice to the receiving area. Unfortunately, the known ice delivery systems generally suffer from either an inherent time delay in the delivery of cubed ice following a crushed ice dispensing operation and/or, upon dispensing cubed ice for the first time after dispensing crushed ice, an avalanche of remaining crushed ice is received. In attempting to adequately control the flow rate of ice towards the receiving area and to prevent undesirable wedging of any ice cubes which could result in jamming of the overall ice delivery system, it has become known to provide a baffle plate within the ice delivery path and to form the baffle plate with an enlarged opening through which the ice cubes must be directed as they flow from the collecting bin to the receiving area. A fair amount of emphasis has been placed on particularly designing the configuration of the passage provided in the baffle plate in an attempt to assure a smooth flow of ice through the system, while also preventing system jamming. For this reason, the passage is generally configured to guide the cubes of ice to a certain cut-off point or zone defined along a forward edge of the passage. If the ice cubes can be properly guided through the baffle plate and to a final ice delivery unit that forms part of the ice crushing mechanism, jamming of the system by the improper wedging of the ice cube can be avoided.

U.S. Pat. No. 5,050,777 is representative of prior art attempts to design a more effective baffle plate passage configuration in order to avoid the wedging of ice cubes. In accordance with this patent, a leading, cut-off edge of the baffle passage extends substantially linearly and terminates at an inner cut-off point. This point is arranged adjacent to, but radially spaced from, a central hub of a drum dispenser provided to direct the ice cubes through the passage. It is to this point that the ice cubes are directed or guided along the cut-off edge during dispensing of the ice cubes. With this arrangement, stresses are concentrated on this point and, given the location of the point relative to surrounding support structure, a location for premature fatigue failure exists. In other words, since this point represents the location at which ice cubes are forced through the passage of the baffle plate, high stress loads are created at this point during operation of the dispensing system. In addition, since the point is located radially outwardly of the central hub of the dispensing drum, a lack of support directly at this point increases the probability of cracking of the baffle plate along a fault line extending from this cut-off point.

The possibility of fatigue failure of such a baffle plate arrangement becomes more evident when it is realized that approximately fourteen ice cubes are needed for supplying a single glass with crushed ice and that an ice dispensing assembly is generally designed to perform in the order of 100,000 cycles over its effective life. In addition, to reduce manufacturing costs, it is desirable to manufacture the baffle plates out of plastic and, due to both cost and space constraints, to provide a plate which is quite thin, i.e., generally in the order of ⅛ of an inch thick.

Based on the above, there exists a need in the art for an improved ice dispensing assembly which can assure a smooth and consistent flow rate of ice from a collecting bin to a receiving area, while providing a baffle member having a passage that is particularly configured to enable ice cubes to be guided therethrough in an enhanced manner, while minimizing the possibility of any fatigue failure thereof.

SUMMARY OF THE INVENTION

It is an object of the present invention to provide an ice dispensing assembly for a refrigerator that is designed to provide a smooth, continuous flow of ice cubes in a controlled manner which will prevent undesirable wedging of the ice cubes and jamming of the system. It is another object of the present invention to provide an ice dispensing assembly with a specifically configured baffle passage that can provide for a uniform and consistent flow of ice cubes therethrough and which will have an associated, extended useful life. More specifically, it is an object to provide the passage with a forward edge that is constituted by a continuous arc, extending from an outer radial portion of the passage to an inner radial portion thereof, along which ice cubes can be guided radially inwardly for passage through the baffle plate and wherein the innermost radial end of the forward edge terminates directly adjacent additional support structure to minimize the potential for any fatigue failure at this location.

An ice dispensing assembly for a refrigerator in accordance with the present invention includes a collecting bin from which stored ice cubes are delivered into a frontal discharge housing by a first ice delivery unit. The discharge housing has rotatably mounted therein second and third ice delivery units, with the second ice delivery unit including a central hub mounted for co-rotation with the first ice delivery unit and a plurality of vanes extending radially from the hub. The third ice delivery unit includes a plurality of rotatable arms mounted on a shaft extension of the first ice delivery unit, with the arms being adapted to cooperate with one or more anvil elements when crushed ice is selected. Interposed between the second and third ice delivery units is a baffle plate that is formed with a passage through which the ice is directed. The passage is defined by an outer radial edge, an arcuate inner radial edge having first and second end sections, an arcuate forward edge leading from the first end section of the inner radial edge to the outer radial edge, and a rear edge extending from the radial outer edge to the second end section of the inner radial edge. The arcuate forward edge is preferably generally crescent-shaped so as to define a continuously curving edge, along which ice cubes can be guided radially inwardly for passage through the baffle plate. The central hub of the second ice delivery unit is specifically arranged to have its outer surface contiguous with the inner radial edge of the passage. In addition, the forward edge of the passage terminates directly adjacent the central hub. With this arrangement, a smooth, continuous flow of ice cubes can be directed through the passage to prevent undesirable wedging of the ice and structural reinforcement is provided for the baffle plate at the area of highest stress concentration.

Additional objects, features and advantages of the present invention will become more readily apparent from the following detailed description of a preferred embodiment thereof when taken in conjunction with the drawings, wherein like reference numerals refer to the corresponding parts.

DETAILED DESCRIPTION OF THE PREFERRED EMBODIMENT

Figure 1:
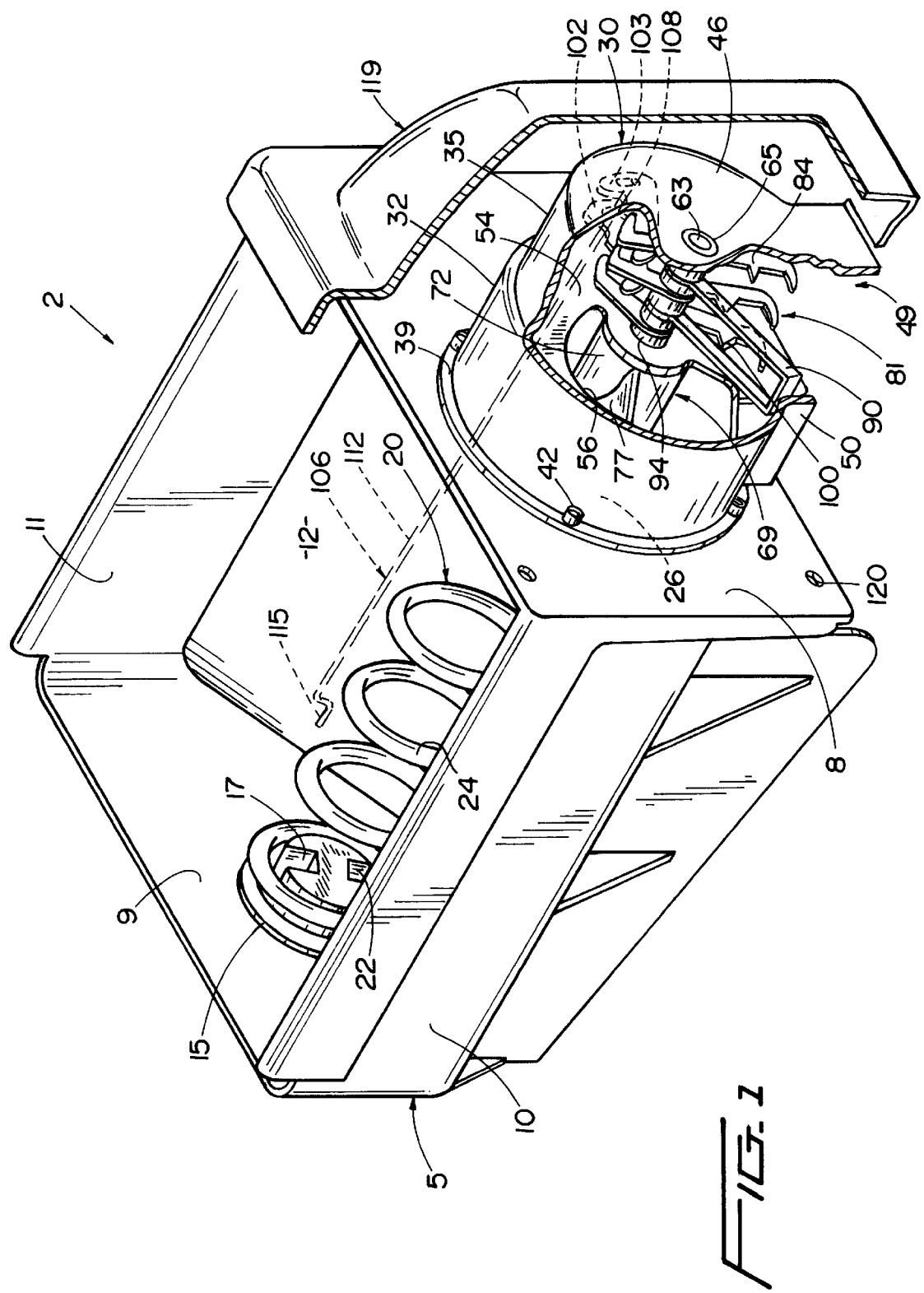
FIG. 1 is a perspective view of the ice dispensing assembly of the present invention with portions thereof cut-away to illustrate internal elements of the assembly.

With initial reference to FIG. 1, the ice dispensing assembly of the present invention is generally indicated at 2. Ice dispensing assembly 2 includes an ice collecting bin 5 that is adapted to receive ice cubes from an automatic ice cube maker (not shown) and to store the ice cubes for selective dispensing at a later time. Ice collecting bin 5 is generally formed from upstanding front, rear and side walls 8–11, as well as sloping bottom sections, one of which is indicated at 12. In the preferred embodiment, the entire ice collecting bin 5 is integrally molded of plastic. It should be recognized that the particular shape of ice collecting bin 5 can be varied depending upon the size and configuration of the refrigerator area within which it is adapted to be mounted without departing from the spirit of the invention. Rotatably mounted within an aperture (not shown) formed in rear wall 9 of ice collecting bin 5 is a journal member 15 having a pair of opposing cut-out sections 17. In a manner known in the art, journal member 15 is adapted to engage a drive unit (not shown) within the freezer compartment of a refrigerator, with the drive unit being selectively activated to deliver ice cubes in a manner which will be more fully discussed below.

Mounted within ice collecting bin 5 is a first ice delivery unit 20. In the preferred embodiment, first ice delivery unit 20 takes the form of an auger having one end 22, which is received within selected cut-out section 17 of journal member 15, and a helically coiled section 24 which leads up to a front opening 26 formed in front wall 8 of ice collecting bin 5. Mounted about front opening 26 is a discharge housing 30 that includes a first portion 32 and a second portion 35. More specifically, first portion 32 includes an annular flange 39 that extends annularly about front opening 26 and which is provided with a plurality of cylindrical bosses 42. In the preferred embodiment, the entire discharge housing 30 is integrally molded of plastic and is secured to front wall 8 of ice collecting bin 5 by means of a plurality of screws (not shown) which extend through front wall 8 and which are threadably received within cylindrical bosses 42. Discharge housing 30 also includes a frontal plate 46 and defines a discharge opening 49 which, in the preferred embodiment, takes the form of an elongated slot that is defined by downturned and spaced flanges, one of which is shown at 50, extending along a bottom portion of discharge housing 30.

Mounted within discharge housing 30 and separating first and second portions 32 and 35 thereof is a baffle plate 54. Baffle plate 54 is formed with a passage 56, as well as a central through hole 59. Central through hole 59 accommodates an axial shaft extension of first ice delivery unit 20 that terminates in an end 63 that projects within an aperture 65 provided in frontal plate 46. Therefore, first ice delivery unit 20 is supported for rotation at journal member 15, by baffle plate 54 and further within aperture 65 of frontal plate 46.

Positioned within first portion 32 of discharge housing 30 is a second ice delivery unit 69. In the preferred embodiment, second ice delivery unit 69 includes a central hub 72 that receives the shaft extension of first ice delivery unit 20 and is mounted for co-rotation with the first ice delivery unit 20. Central hub 72 includes an outer surface from which radially project a plurality of vanes, one of which is indicated at 77. Each of the vanes is helically configured and, in the preferred embodiment of the invention, two opposing vanes are provided (see FIG. 2). Second ice delivery unit 69 also includes an outer circumferential wall portion 79 (see FIG. 2) that interconnects outer radial portions of vanes 77. Basically, with this construction, second ice delivery unit 69 generally constitutes an impeller unit having a plurality of helical vanes 77 which are supported by the central hub 72 and the outer circumferential wall 79. In the preferred embodiment, the second ice delivery unit 69 is also preferably, integrally molded of plastic.

Rotatably mounted within second portion 35 of discharge housing 30 is a third ice delivery unit generally indicated at 81. In the most preferred form, third ice delivery unit 81 includes a plurality of rotating arm members 84. In the most preferred form of the invention, arms 84 actually constitute blades of an ice crushing mechanism incorporated in the ice dispensing assembly 2 as will be more fully detailed below. As clearly shown in FIG. 1, arms 84 are axially spaced along the shaft 15 extension of first ice delivery unit 20 and a respective ice diverter 90 is interposed between adjacent ones of the arms 84. Actually, each of the arms 84 is preferably formed from metal and is secured to first ice delivery unit 20 with plastic axial spacers 94 and a plastic nut (not shown). Ice diverter 90 is actually formed from an integral, generally U-shaped member with the base of the member being supported by the discharge housing 30 at an outer radial location. With this arrangement, ice diverter 90 advantageously functions to direct all delivered ice cubes in a single direction as will become more fully apparent below.

As indicated above, arms 84 generally constitute blades that are formed with one or more spikes 100. During operation of ice dispensing assembly 2, arms 84 are adapted to rotate clockwise as viewed in FIG. 1 and, when crushed ice is selected for dispensing by an operator through a suitable switch or lever in a manner known in the art, arms 84 are adapted to cooperate with additional structure to crush ice cubes within second portion 35 of discharge housing 30. In the preferred embodiment shown, this additional structure comprises a pair of ice crushing anvil elements 102 and 103 that are pivotally mounted for movement into and out of the ice delivery path defined within second portion 35 of discharge housing 30. More specifically, anvil elements 102 and 103, which also preferably include spiked portions (not labeled) in a manner generally analogous to spikes 100, are adapted to be shifted through the use of an elongated linkage 106 having a first end portion 108 that extends through slots (not labeled) formed in anvil elements 102 and 103. Elongated linkage 106 also includes an elongated body portion 112 and a second end portion 115 which is positioned below and at an external rear section of ice collecting bin 5. Although not shown, elongated body portion 112 is mounted for rotation relative to collecting bin 5 and second end portion 115 is adapted to be rotated by an actuating member to shift anvil elements 102 and 103 into and out of the ice delivery path within second portion 35 of discharge housing 30 in dependence upon the positioning of the user selector switch or lever as discussed above. Since the manner in which the selector arrangement operates is not considered part of the present invention, it will not be detailed further herein. In any event, when anvil elements 102 and 103 assume the positions shown in FIG. 1, ice cubes delivered into second portion 35 of discharge housing 30 are crushed during rotation of third ice delivery unit 81 as arms 84 rotate past anvil elements 102 and 103. For the sake of completeness, ice dispensing assembly 2 is also shown to include a front cover 119 which projects over discharge housing 30 and is secured to front wall 8 of ice collecting bin 5 by means of a plurality of screws (not shown) that extend through holes 120 provided in front wall 8.

Figure 2:
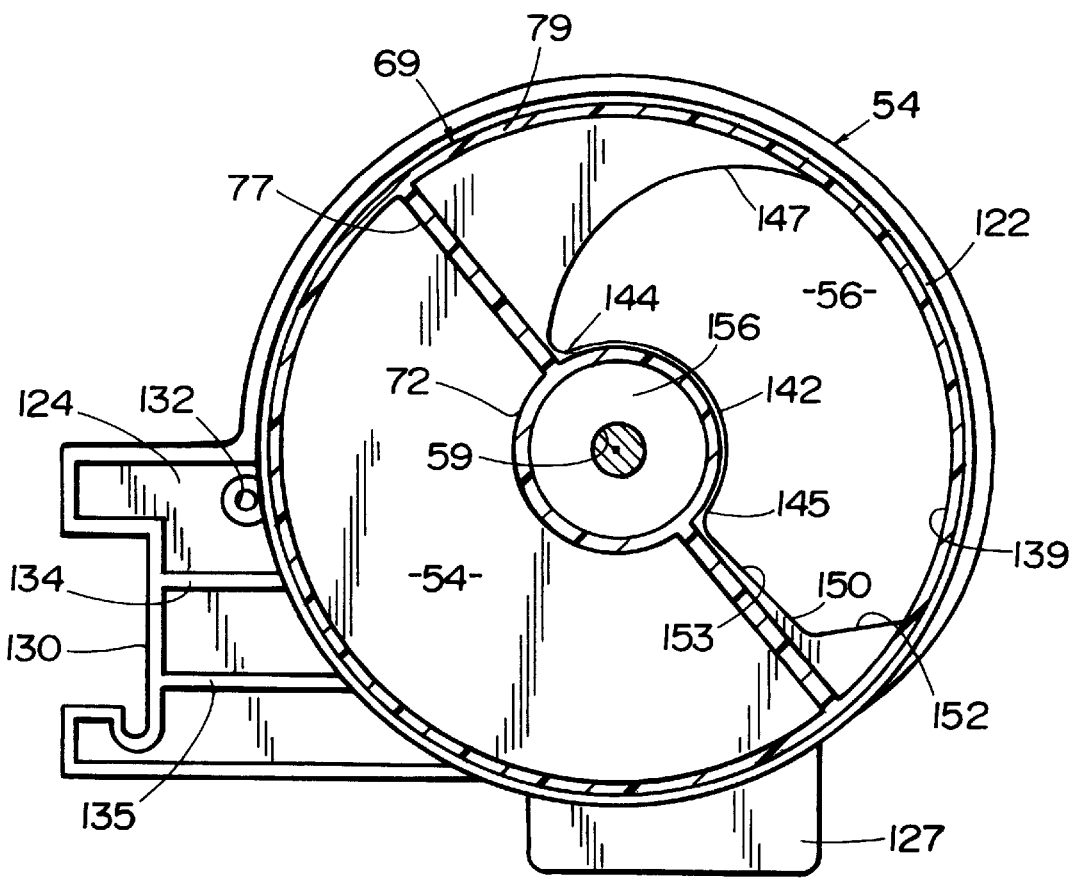
FIG. 2 is a rear elevational view generally illustrating the construction of a baffle plate member incorporated in the ice dispensing assembly of the invention.

Reference will now be made to FIG. 2 in describing the preferred construction of baffle plate 54 and the manner in which this member is complemented by the mounting of second ice delivery unit 69 to ensure a structurally sound ice delivery system, while providing for a smooth and consistent flow of ice into second portion 35 of discharge housing 30. As illustrated in this rear view, baffle plate 54 generally takes the form of a plate having a raised outer lip 122 that enables outer circumferential wall 79 of second ice delivery unit 69 to be properly seated therein for relative rotation. Baffle plate 54, which is also preferably integrally formed of plastic, is provided with a side extension 124 and a lower extension 127. Side extension 124 includes a notched-out section 130 that is adapted to receive and accommodate the movement of elongated linkage 106. Side extension 124 also includes a reinforced bore 132 to which the ice crushing anvil elements 102 and 103 are rotatably mounted for movement into and out of the ice delivery path within second portion 35 of discharge housing 30. For structural support, side extension 124 is also provided with ribs 134 and 135.

An important feature of the present invention that assures an extended useful life of ice dispenser assembly 2 and a smooth and consistent flow rate of ice into second portion 35 of discharge housing 30 is the configuration of passage 56 as will now be detailed. Passage 56 includes an outer radial edge 139, an arcuate inner radial edge 142 having first and second end sections 144 and 145, an arcuate forward or guiding edge 147 that leads from first end section 144 of inner radial edge 142 to outer radial edge 139, and a rear edge 150 that extends from outer radial edge 139 to the second end section 145 of inner radial edge 142. Actually, rear edge 150 preferably includes a first linear section 152 and a second linear section 153. The arcuate inner radial edge 142 of passage 56 is actually defined by a central bridge section 156 of baffle plate 54 that extends about a portion of central through hole 59.

As clearly illustrated in FIG. 1, central bridge section 156 is covered, on the rear side of baffle plate 54, by central hub 72 of second ice delivery unit 69. Given the continuous arcuate configuration of inner radial edge 142, central hub 72 is contiguous with inner radial edge 142 of passage 56. Since forward edge 147 extends directly from inner radial edge 142, forward edge 147 terminates directly adjacent the central hub 72. Actually, in the preferred embodiment, forward edge 147 is generally crescent-shaped such that it represents a continuous arc. This configuration has been found to enhance the smooth and consistent flow of ice through passage 56. In addition, the connection between forward edge 147 and first end section 144 of inner radial edge 142 is radiused in order to avoid stress risers. Therefore, except for the presence of this radiused connection, forward edge 147 essentially terminates directly at central hub 72.

This configuration of passage 56 and its association with central hub 72 assures that ice cubes will be properly guided for a smooth and continuous flow into second portion 35 of discharge housing 30 and will prevent premature failure of baffle plate 54 given that the location of higher stress concentrations, i.e., at the innermost radial end of forward edge 147 where the ice cubes are caused to flow into second portion 35 of 25 discharge housing 30, has direct support due to the relative positioning with central hub 72. In other words, the ice cubes will be directed through passage 56 at the strongest portion of baffle plate 54. More specifically, during operation of ice cube dispensing assembly 2, the ice cubes will be delivered from collecting bin 5 into first portion 32 of discharge housing 30 by means of ice delivery unit 20. Thereafter, second ice delivery unit 69 directs the cubed ice into second portion 35 of discharge housing 30. Regardless of whether cubed or crushed ice is selected, each of the first, second and third ice delivery units 20, 69 and 81 rotate clockwise during a dispensing operation in the preferred embodiment disclosed.

Obviously, all of the ice flowing into second portion 35 of discharge housing 30 must extend through passage 56. More specifically, the ice will be forced to flow radially inwardly and forwardly by second ice delivery unit 69 and will be guided along forward edge 147 towards inner radial edge 142. At the juncture of inner radial edge 142 and arcuate forward edge 147, i.e., directly adjacent central hub 72, ice will be forced into second portion 35 of discharge housing 30. This action can create high stresses on the baffle plate 54 as indicated above. However, the continuous arcuate configuration of forward edge 147 assures that the ice cubes will be smoothly guided radially inwardly and the termination of forward edge 147 directly adjacent central hub 72 assures the forces from the interaction of the ice cubes with the baffle plate 54 will be directed through the strongest portion of baffle plate 54, thereby providing for an extended useful life of baffle plate 54. Due to the manner in which the ice cubes are guided into second portion 35 of discharge housing 30, a uniform and consistent delivery of the ice cubes is provided in order to prevent undesirable jamming of the system, while also minimizing any residual crushed ice pieces within second portion 35 following a crushed ice dispensing operation. Therefore, if cubed ice is selected following a crushed ice dispense, crushing anvil elements 102 and 103 will be rotated from the ice path and the cubes stored in second portion 35 of discharge housing 30 between the crushing anvil elements 102 and 103 and arms 84 will be delivered as cubes with no avalanching of ice.

Although described with respect to a preferred embodiment of the invention, it should be readily understood that various changes and/or modifications can be made to the invention without departing from the spirit thereof. For instance, the baffle plate arrangement described above can also be utilized with non-crushing ice dispensing units if desired. In general, the invention is only intended to be limited by the scope of the following claims.

I claim:

1. An ice dispensing assembly for a refrigeration device comprising:
    a collecting bin adapted to house ice cubes;
    a discharge housing including a first portion which opens into the collecting bin and a second portion, spaced from the first portion, having an associated ice discharge opening;
    a baffle member fixed within the discharge housing between the first and second portions, the baffle member being formed with a through passage enabling a flow of ice from the first portion to the second portion of the discharge housing, the passage being defined by an outer radial edge, an arcuate inner radial edge having first and second end sections, an arcuate forward edge leading from the first end section of the inner radial edge to the outer radial edge, and a rear edge extending from the radial outer edge to the second end section of the inner radial edge; and
    an ice supplying mechanism for directing ice cubes from the collecting bin to the discharge opening, with the ice supplying mechanism including a first ice delivery unit, located in the collecting bin for directing a flow of ice cubes from the collecting bin into the first portion of the discharge housing, a second ice delivery unit, rotatably mounted within the first portion of the discharge housing, for directing ice cubes to the passage of the baffle member and into the second portion of the discharge housing, and a third ice delivery unit rotatably mounted within the second portion of the discharge housing for directing ice to the discharge opening, wherein the second ice delivery unit includes a central hub, having an associated outer surface, and a plurality of vanes projecting radially from the central hub, with a portion of the central hub being contiguous with the inner radial edge of the passage formed in the baffle member and the forward edge of the passage terminating directly adjacent the central hub.

2. The ice dispensing assembly according to claim 1, wherein the forward edge is directly joined with the first end section of the inner radial edge by a radiused connection and is spaced from the central hub only by this radiused connection.

3. The ice dispensing assembly according to claim 1, wherein the forward edge is formed as a continuous arc along which ice cubes are guided radially inwardly when flowing from the first portion to the second portion of the discharge housing.

4. The ice dispensing assembly according to claim 3, wherein the continuous arc is generally crescent-shaped.

5. The ice dispensing assembly according to claim 4, wherein the outer radial edge defines a smooth arcuate extension of the crescent-shaped arc of the forward edge.

6. The ice dispensing assembly according to claim 3, wherein the second ice delivery unit further comprises an outer circumferential wall that interconnects outer radial ends of the plurality of vanes and the baffle member further includes an outer radial rim projecting from one surface portion of the baffle member, with the outer circumferential wall of the second ice delivery unit being contained within the rim.

7. The ice dispensing assembly according to claim 6, wherein the baffle member further includes a lower extension that defines a portion of the discharge opening.

8. The ice dispensing assembly according to claim 1, further comprising: at least one ice cube crushing anvil element, adapted to cooperate with the third ice delivery unit for selectively crushing ice cubes entering the first portion of the discharge housing, arranged annularly between the passage of the baffle member and the ice discharge opening.

9. The ice dispensing assembly according to claim 8, wherein the baffle member includes a notched, radial extension to which the at least one ice cube crushing anvil element is attached.

10. The ice dispensing assembly according to claim 3, wherein the first ice delivery unit is constituted by an auger having a helically coiled section located in the collecting bin and an axial shaft extension that projects through the baffle member and is rotatably supported by the discharge housing, and wherein the central hub of the second ice delivery unit and the third ice delivery unit are fixed for rotation with the axial shaft extension.

11. The ice dispensing assembly according to claim 10, further comprising a drive transfer member rotatably journaled at a rear portion of the collecting bin, wherein the drive transfer member is adapted to be driven in a unidirectional manner whenever the ice dispensing assembly is operating.

12. The ice dispensing assembly according to claim 10, wherein the third ice delivery unit includes a plurality of arms which are axially spaced along the shaft extension in the second portion of the discharge housing and the ice dispensing assembly further comprises an ice diverter axially interposed between selected ones of the arms and extending radially outwardly from the axial shaft extension to the discharge housing.

13. The ice dispensing assembly according to claim 1, further comprising: an ice diverter extending radially across the second portion of the discharge housing for directing ice cubes in a single flow direction within the second portion of the discharge housing.

14. The ice dispensing assembly according to claim 13, wherein the ice diverter extends adjacent the rear edge of the passage formed in the baffle member.

15. The ice dispensing assembly according to claim 14, wherein the ice diverter is generally U-shaped.

* * * * *